United States Patent [19]
Bruch

[11] 3,742,127
[45] June 26, 1973

[54] METHOD FOR RECORDING A PAL COLOR TELEVISION SIGNAL

[75] Inventor: Walter Bruch, Hannover, Germany

[73] Assignee: Licentia Patent-Verwaltungs-GMBH, Frankfurt am Main, Germany

[22] Filed: Sept. 28, 1971

[21] Appl. No.: 184,427

[30] Foreign Application Priority Data

Oct. 2, 1970 Germany .................. P 20 48 501.2

[52] U.S. Cl. .......................... 178/5.4 CD, 178/6.6 A
[51] Int. Cl. .......................... H04n 5/78, H04n 9/32
[58] Field of Search .................. 178/6.6 A, 5.4 CD, 178/5.4 R

[56] References Cited

UNITED STATES PATENTS

| | | | |
|---|---|---|---|
| 2,921,976 | 1/1960 | Johnson | 178/6.6 A |
| R26,412 | 6/1968 | Dolby | 178/5.4 CD |
| 3,275,742 | 9/1966 | Quinton | 178/5.4 R |

*Primary Examiner*—Howard W. Britton
*Attorney*—George H. Spencer et al.

[57] ABSTRACT

In the recording of a PAL color television signal wherein the modulated chrominance subcarrier frequency is shifted by 25 Hz with respect to a frequency having a quarter-line frequency offset with respect to the horizontal sweep frequency and is recorded in this form in a frequency band outside that of the luminance signal, the chrominance subcarrier is so shifted that in its recorded form it retains the 25 Hz shift and quarter-line frequency offset.

2 Claims, 2 Drawing Figures

METHOD FOR RECORDING A PAL COLOR TELEVISION SIGNAL

BACKGROUND OF THE INVENTION

The present invention relates to the recording of television signals, particularly color television signals.

An FBAS-PAL (*F*arb*b*ild*a*ustast*s*ignal- color video signal-*P*hase *A*lternating *L*ine) signal is known to be impossible to record with simple recording instruments because the frequency of the chrominance subcarrier, which is 4.43 MHz, lies outside of the recording bandwidth of such instruments. It is known to reduce the frequency of the chrominance subcarrier through mixing or division, e.g. from 4.43 MHz to 0.5 MHz, and to record the chrominance subcarrier having this reduced frequency, e.g. below the FM spectrum of a luminance signal which is simultaneously being recorded in the form of an FM signal.

The reduced chrominance subcarrier frequency is here, for example, a whole number multiple of the horizontal sweep frequency because such a frequency can easily be derived from the horizontal sweep frequency and because it is possible, during playback, to derive from the horizontal sweep frequency a voltage for compensating time errors, which voltage represents recorder speed fluctuations.

When playing back a signal recorded in this manner it has been found that for certain colors annoying interference in the form of vertical stripes appears in the reproduced picture. This is probably due to vestiges of the amplitude modulation of the chrominance subcarrier which enter into the frequency modulation of the simultaneously recorded luminance signal. With known control circuits for removing time errors during playback, this interference cannot be avoided.

SUMMARY OF THE INVENTION

It is an object of the present invention to remove or reduce interference of this type.

This is accomplished, according to the present invention, by shifting the chrominance subcarrier frequency by such an amount that in the recorded chrominance subcarrier the usual 25 Hz frequency shift and quarter-line frequency offset remain unchanged. A quarter-line frequency offset is a frequency difference equal to one-fourth the horizontal sweep frequency. The shifted chrominance subcarrier frequency may be shifted by a whole multiple of the horizontal sweep frequency in addition to being given the quarter-line frequency offset and the 25 Hz shift, the latter being half the vertical sweep frequency.

The present invention is based on the recognition that it is advisable, contrary to conventional techniques, to maintain the quarter-line frequency offset and 25 Hz frequency shift present in the PAL chrominance subcarrier during the frequency division. For reasons of compatibility this did not previously seem to be necessary for the above-described type of recording because there, contrary to the normal FBAS signal, the chrominance subcarrier and the luminance signal lie in different frequency bands in the color television receiver and are in any event separated, during playback, by means of filters. However, applicant has found that the maintenance of the quarter-line offset and 25 Hz shift results in an improvement in the reproduced picture. In the simplest case, the frequency shift for the recording can be obtained by shifting the original chrominance subcarrier frequency by a whole number multiple of the horizontal sweep frequency. In the equation:

$$f_O = (k - \tfrac{1}{4})\, f_H + f_v/2,$$

where $f_O$ = chrominance subcarrier frequency, $f_H$ = horizontal sweep frequency, $f_v$ = vertical sweep frequency, and $k$ = a whole number, the number $k$ is then changed by a whole number, e.g. it is reduced, to effect the frequency division.

DESCRIPTION OF THE PREFERRED EMBODIMENTS

Figure 1:
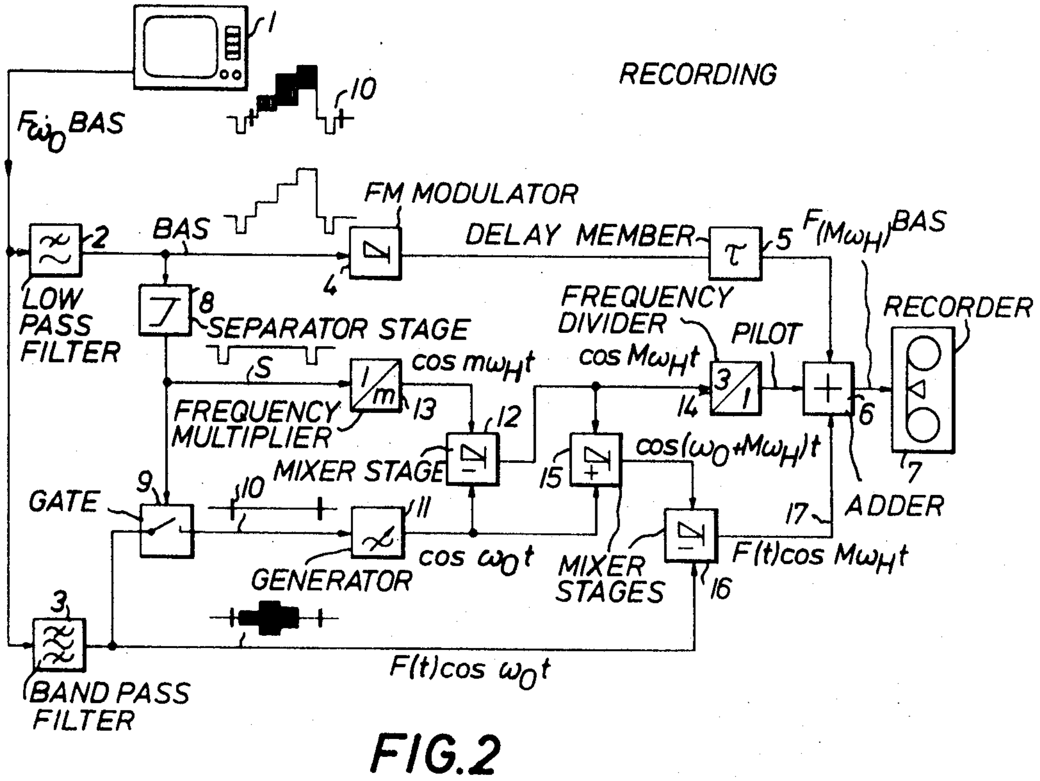
FIG. 1 is a block circuit diagram of a recording system according to the invention.

In the drawings the frequencies of the voltages present at the different points are illustrated as trigonometric functions. The individual designations are:

$\omega_O$ = original standard PAL chrominance subcarrier frequency (4.43 MHz), in radians;

$\omega_H$ = horizontal sweep frequency, in radians;

$M$ = fraction representing the relation between the vertical sweep frequency and the shifted chrominance subcarrier frequency including the quarter-line offset and the 25 Hz shift;

$m$ = a whole number;

$F$ = modulated chrominance subcarrier; and $\Delta$ = time error in the scanned chrominance subcarrier.

In FIG. 1, the FBAS signal coming from a color television receiver 1 is split, by means of a lowpass filter 2 and a bandpass filter 3, into the component BAS, which contains the luminance signal Y and the line sync pulses S, and the component comprised of the modulated chrominance subcarrier F. The BAS signal is delivered to an FM modulator 4 frequency to modulate a carrier and the modulated carrier is fed as an FM signal via a delay member 5 to an adder stage 6 whose output is connected to the input of a recording device 7. There the BAS signal is recorded in FM form in a known manner, e.g. within the range of 1–4 MHz.

By means of a separator stage 8 the line sync pulses S are separated from the remainder of the BAS signal and are converted in a frequency multiplier 13 having a multiplication factor $m$ into a voltage with the radian frequency $m \cdot \omega_H$. A gate 9 is enabled by the line sync pulses S to extract the color burst signals 10 and deliver them to a generator 11 for causing it to produce a voltage at the chrominance subcarrier frequency $\omega_O$.

In a mixer stage 12 the output signal from multiplier 13 is mixed with the output signal from generator 11 to produce a signal with the frequency $M\omega_H$. The frequency of this signal is reduced by a factor of three in a frequency divider 14 and is fed to adder stage 6 as a pilot carrier signal. The pilot carrier could also have the frequency $M\omega_H$.

In a mixer stage 15 the signal at the output of mixer stage 12 is mixed with the signal at the output of generator 11 to produce a further signal having a frequency of $\omega_O + M\omega_H$. In a mixer stage 16 the signals from the outputs of mixer stage 15 and filter 3, the latter being the original, modulated chrominance subcarrier F, produce the desired chrominance subcarrier signal at a reduced frequency $M\omega_H$ (e.g. 0.5 MHz) and this signal is fed to adder stage 6.

It can be seen that the quarter-line offset and the 25 Hz shift indicated by the symbol M, were maintained in the chrominance subcarrier fed to the recording device via line 17.

In order to compensate for different time delays concerning the signal way comprising the FM modulator 4 and the signal way comprising the mixer stage 16 there is provided the delay member 5.

Figure 2:
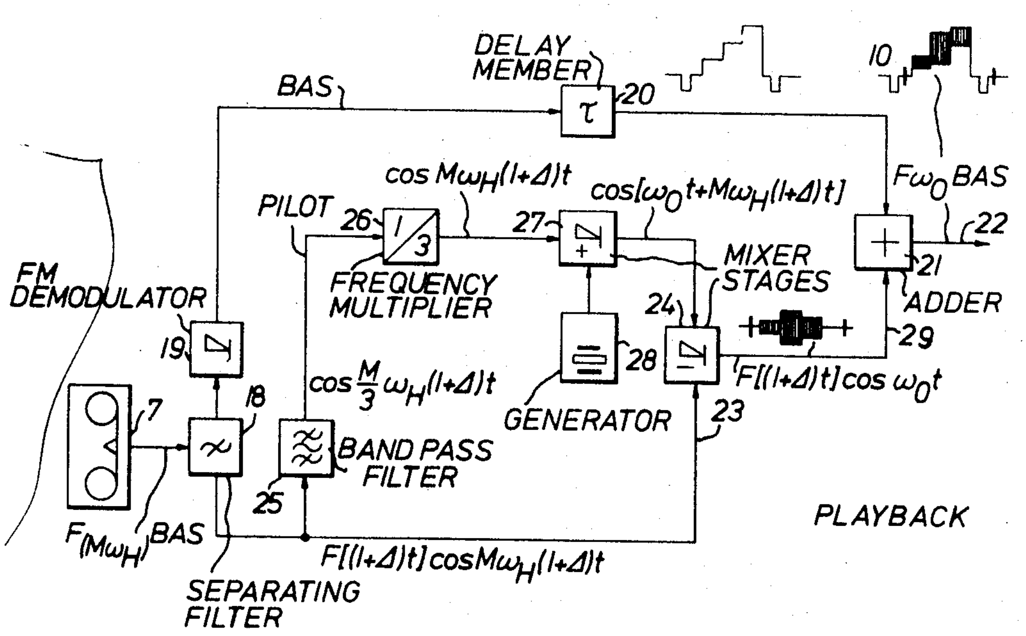
FIG. 2 is a block circuit diagram of a playback system according to the invention.

FIG. 2 shows one embodiment of a corresponding playback circuit. The FBAS signal coming from the recording instrument 7 is split in a separating filter 18 into the components BAS and F. The BAS signal is demodulated in an FM demodulator 19 and fed via a delay member 20 to an adder stage 21 whose output 22 leads to the video input of a television receiver.

The modulated chrominance subcarrier F whose frequency has been reduced travels through a line 23 to a mixer stage 24. A bandpass filter 25 selectively filters out the pilot carrier as recorded according to FIG. 1. This carrier is then converted in a frequency multiplier 26 to a signal at the frequency $M\omega_H$ and the latter signal is mixed in a mixer stage 27 with a signal having the frequency $\omega_0$ which is produced in a generator 28.

The output voltage of mixer stage 27 with the illustrated sum frequency is fed to mixer stage 24. The illustrated frequency symbols indicate that at the output of mixer stage 24 a chrominance subcarrier is present in a line 25, the frequency $\omega_0$ of the chrominance subcarrier again being the original chrominance subcarrier frequency.

It can also be seen that the time error Δ which has been produced by speed fluctuations in the recording device 7 has been removed by the mixing with the pilot carrier and thus has no influence on the color hue. The error Δ is contained only in the amplitude of chrominance subcarrier F and causes only a less annoying change in color saturation.

For a PAL system with 525 lines per frame the 25 Hz shift is not necessary. In this case only the quarter-line offset, or a different offset, would be maintained during the recording according to the present invention.

The delay member 20 is provided for the same purpose as member 5 in FIG. 1 and compensates for different time delays in the signal paths.

It will be understood that the above description of the present invention is susceptible to various modifications, changes and adaptations, and the same are intended to be comprehended within the meaning and range of equivalents of the appended claims.

I claim:

1. In a device for recording a PAL color television signal containing a modulated chrominance subcarrier whose frequency is related to the horizontal sweep frequency of the television signal in a manner which includes a predetermined frequency difference, the improvement comprising:

a. mixer means connected for shifting the chrominance subcarrier to a frequency which is outside the frequency band occupied by the luminance signal component of the color television signal and whose relation to the horizontal sweep frequency retains such predetermined frequency difference, said mixing means comprising:

1. a first mixer connected for mixing a first signal obtained from the horizontal sync pulses (S) of the color television signal and having a frequency which is an integral multiple of the horizontal sweep frequency with a second signal derived from the color bursts of the color television signal and having the frequency of the original chrominance subcarrier for producing a third signal whose frequency equals the shifted frequency of the recorded chrominance subcarrier,
2. a second mixer connected to mix the third signal and the second signal to form a fourth signal whose frequency is the sum of the frequencies of the second and third signals, and
3. a third mixer connected for mixing said fourth signal with the original modulated chrominance subcarrier for producing the shifted chrominance subcarrier; and b. recording means for recording the shifted chrominance subcarrier.

2. A device for playing back a recorded PAL color television signal containing 1. a modulated chrominance subcarrier whose frequency is related to the horizontal sweep frequency of the television signal in a manner which includes a predetermined frequency difference and which has been shifted from its original frequency to a frequency which is outside the frequency band occupied by the luminance signal component of the color television signal and whose relation to the horizontal sweep frequency retains such predetermined frequency difference, and
2. an unmodulated pilot carrier signal having a frequency which is an integral submultiple of the shifted chrominance subcarrier frequency and a fixed phase relation therewith, said device including a circuit connected for reproducing the recorded signal and converting the frequency of the recorded chrominance subcarrier back to its original frequency, said circuit being connected to receive the pilot carrier signal and combine it with the recorded chrominance subcarrier for converting the chrominance subcarrier back to its original frequency, said circuit comprising: means for producing a first signal having the original chrominance subcarrier frequency; means connected to convert the pilot carrier signal into a second signal having a frequency equal to that of the recorded chrominance subcarrier; first mixer means connected to mix the first and second signals to produce a third signal whose frequency is equal to the sum of the frequencies of the first and second signals; and second mixer means connected to mix the third signal and the recorded chrominance subcarrier to produce an output constituting the original modulated chrominance subcarrier.

* * * * *